Sept. 30, 1924.
A. T. KOPPE
1,510,007
MACHINE FOR MAKING OFFSET PRESS PLATES
Filed June. 30, 1922   11 Sheets-Sheet 4
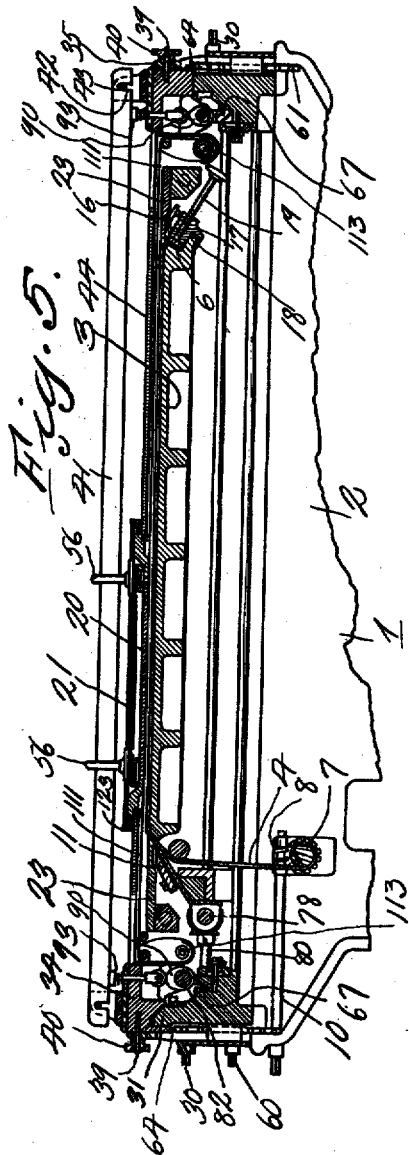
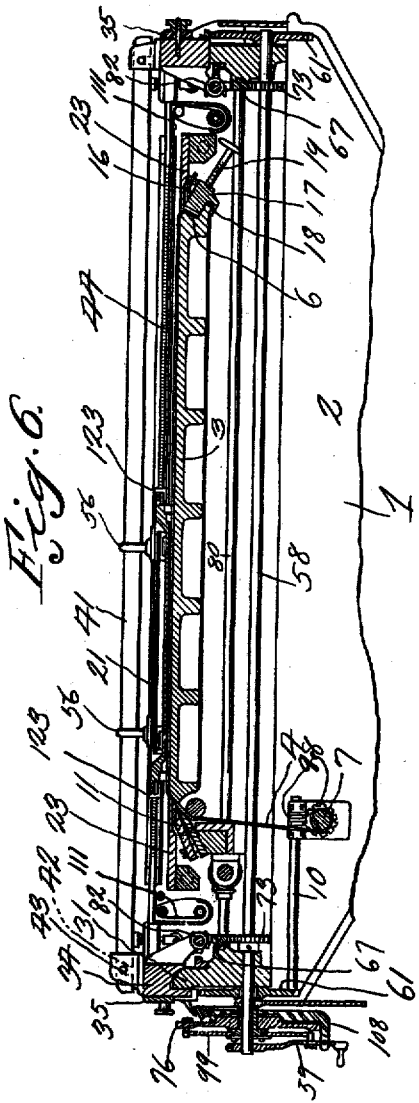
INVENTOR.
Alexander T. Koppe
BY
ATTORNEY.

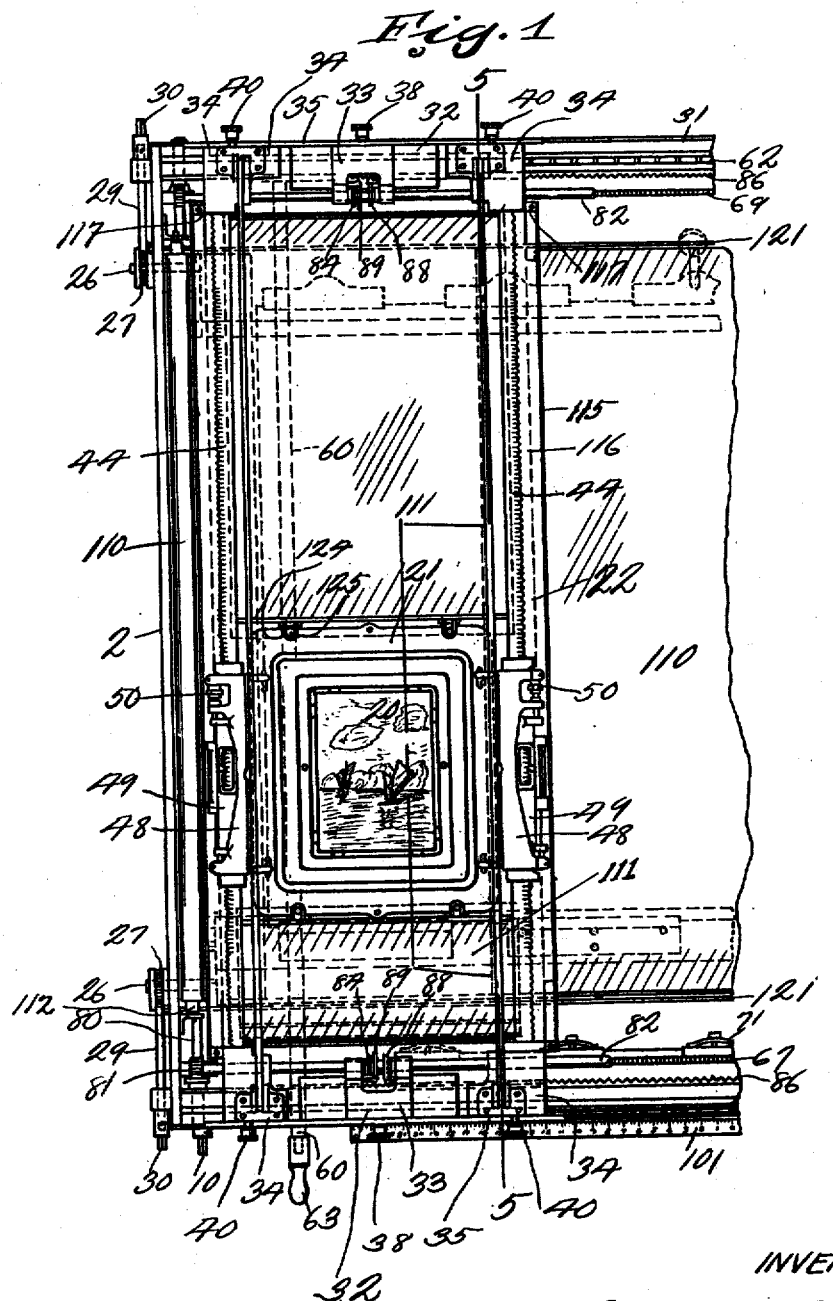

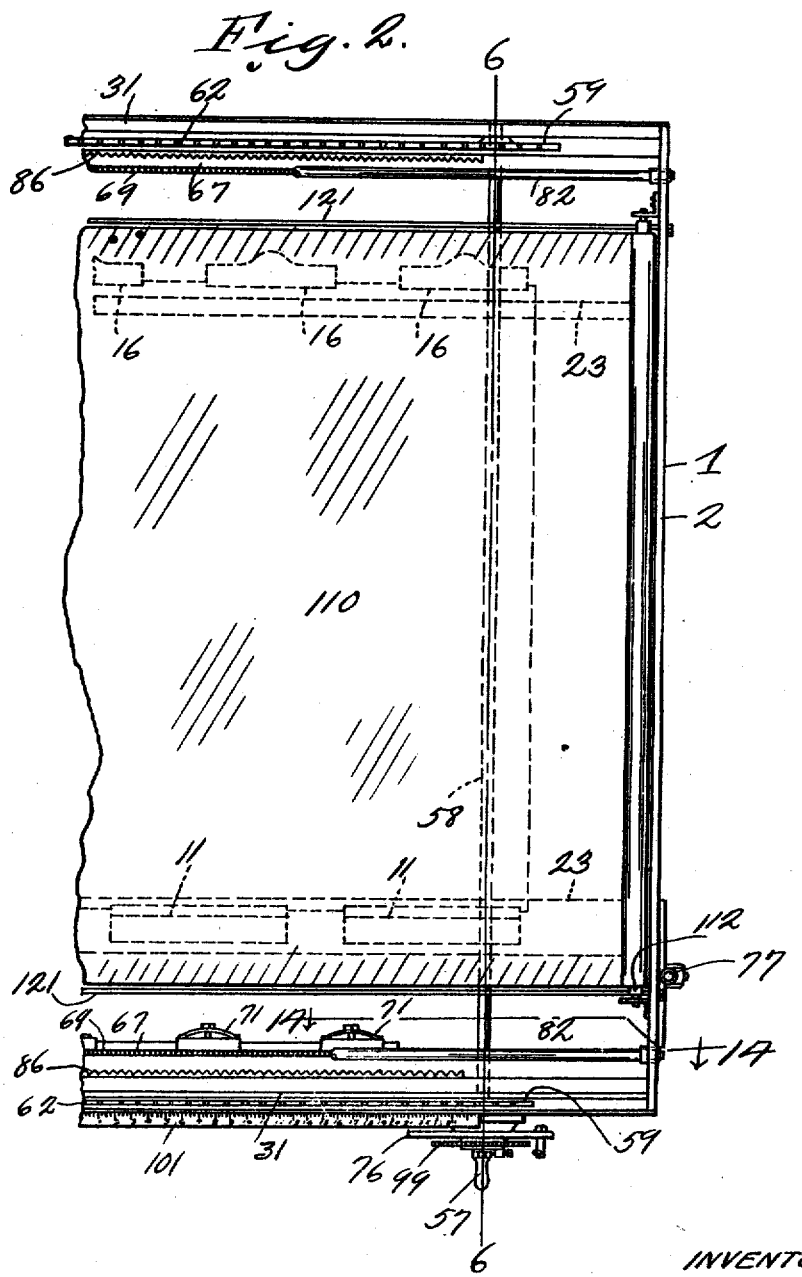

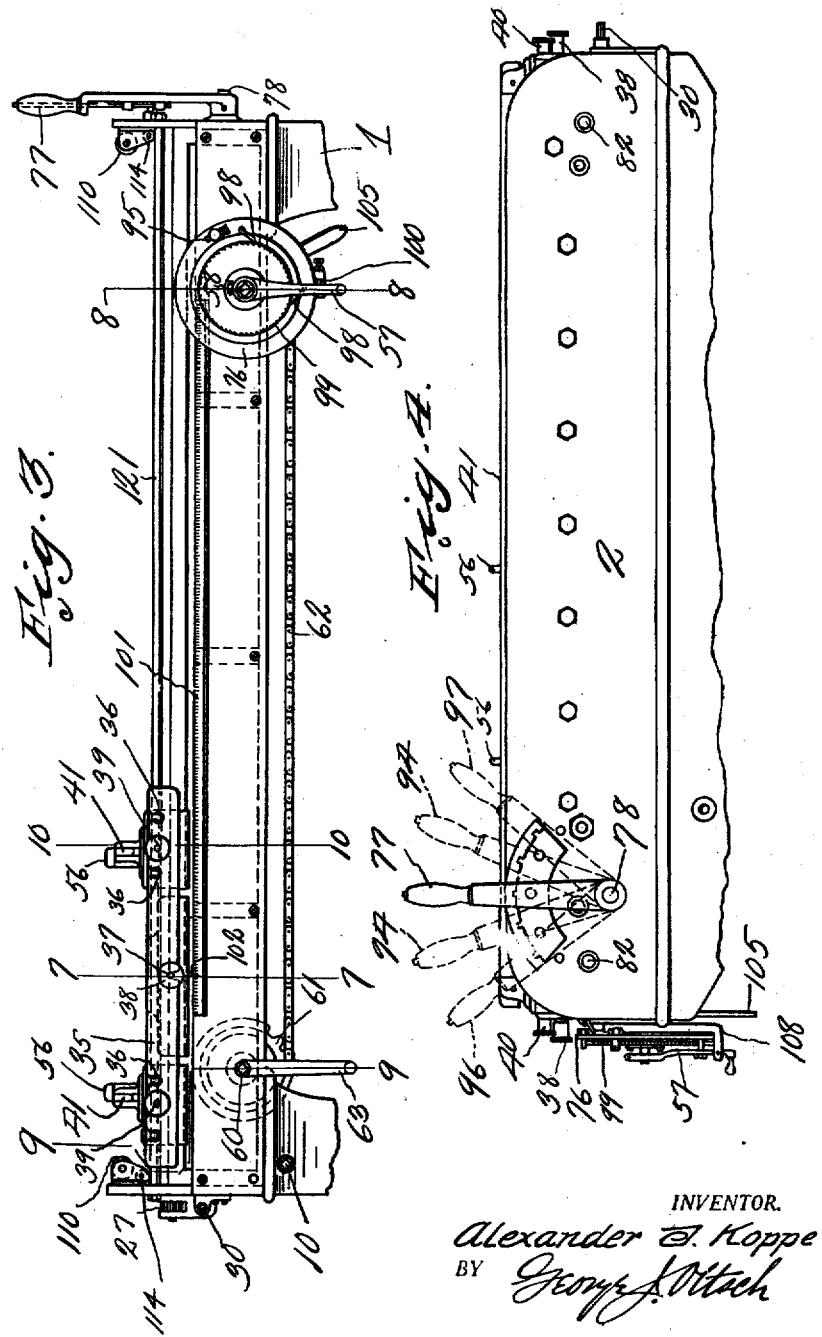

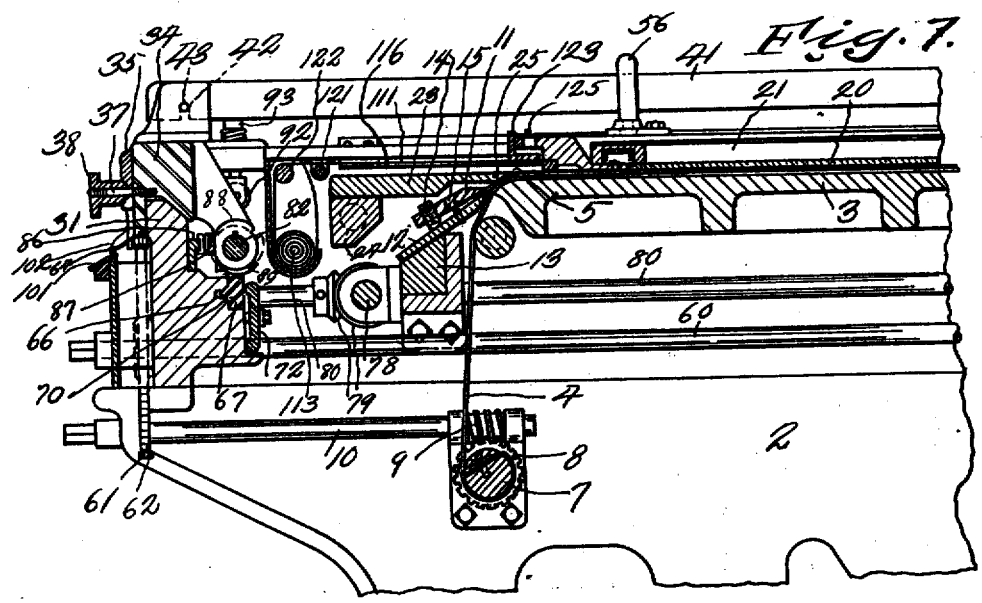
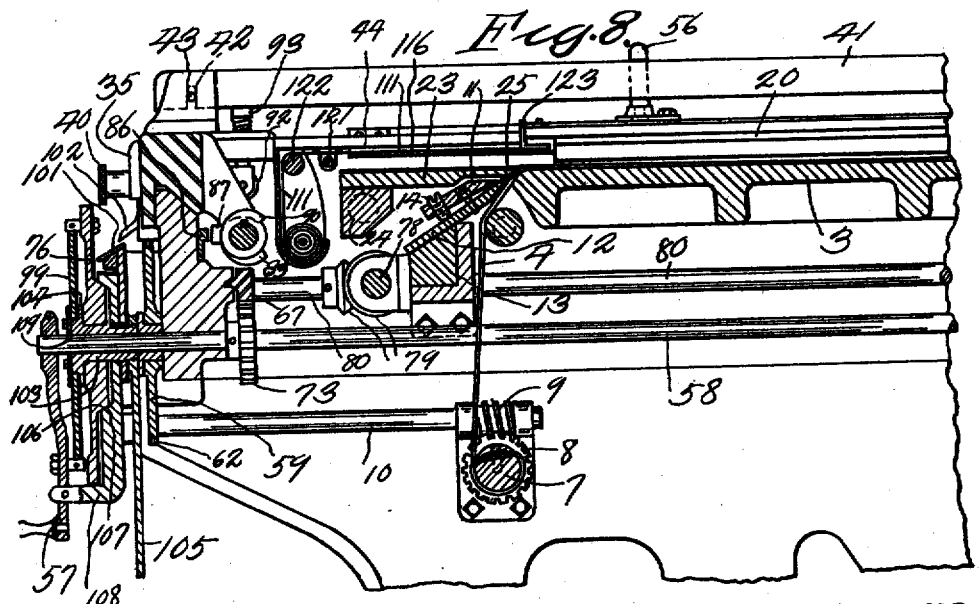

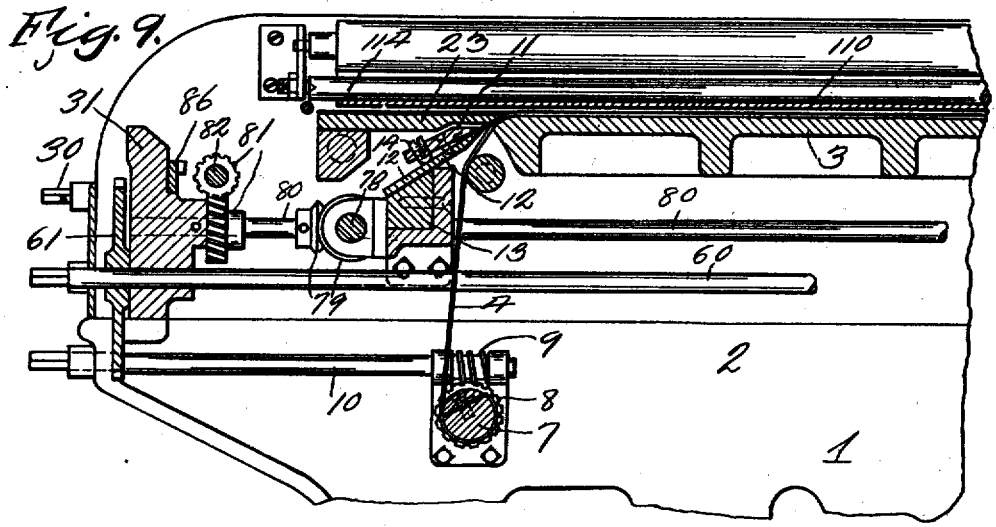
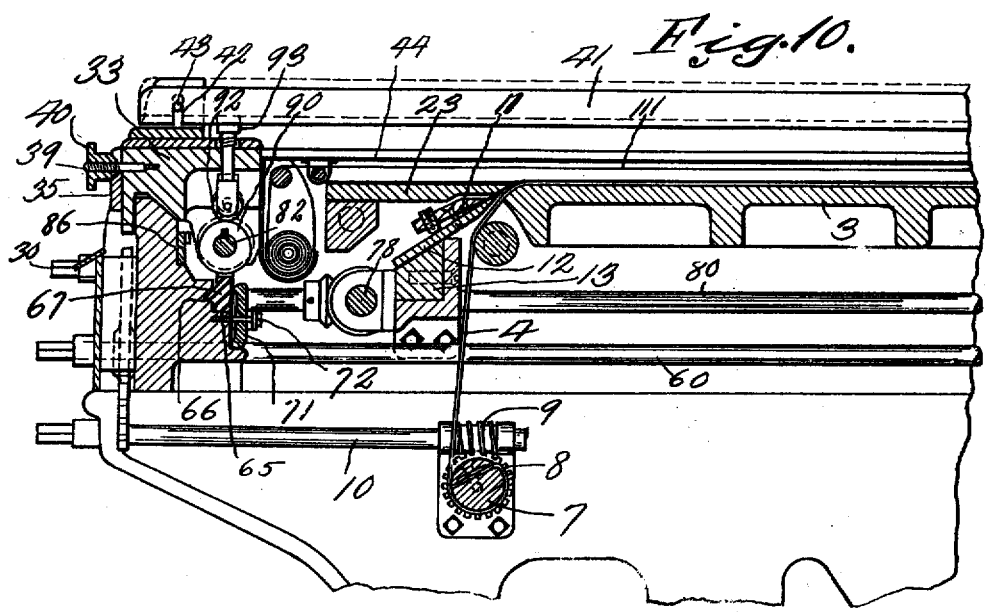

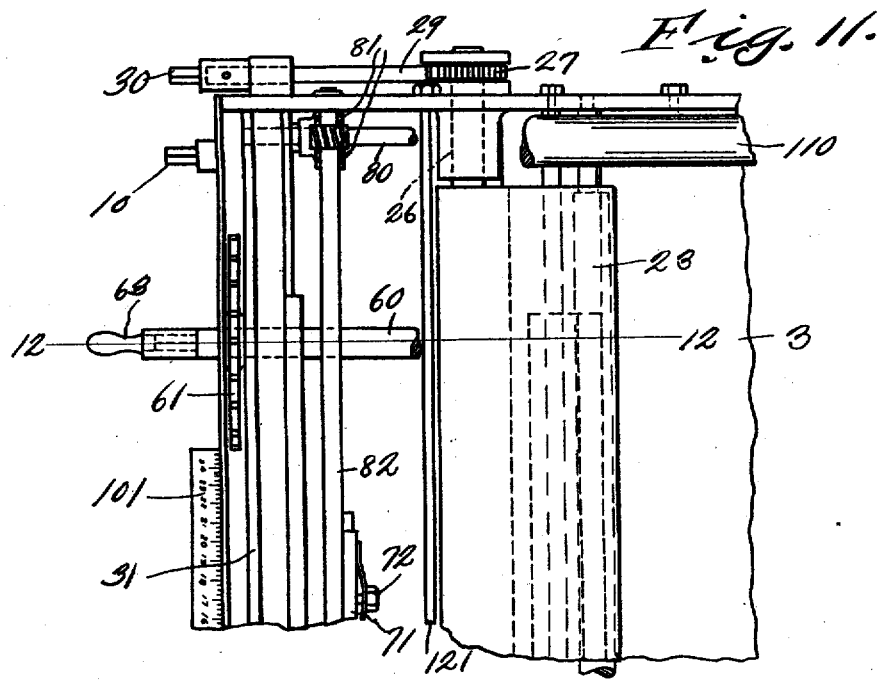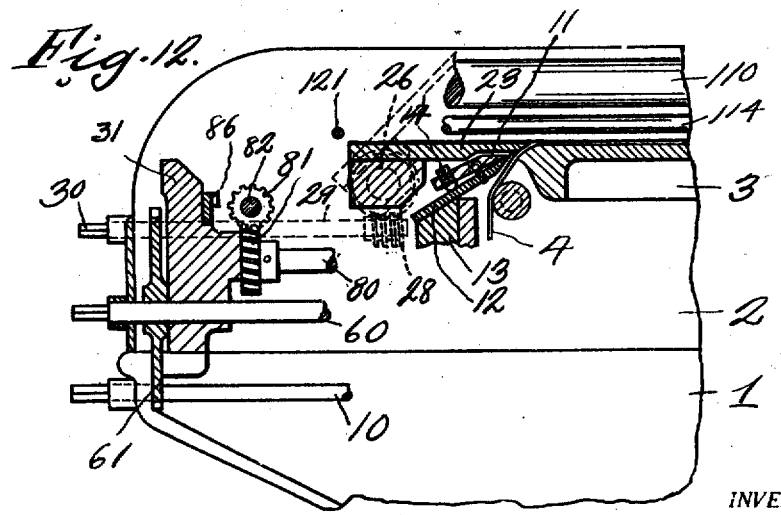

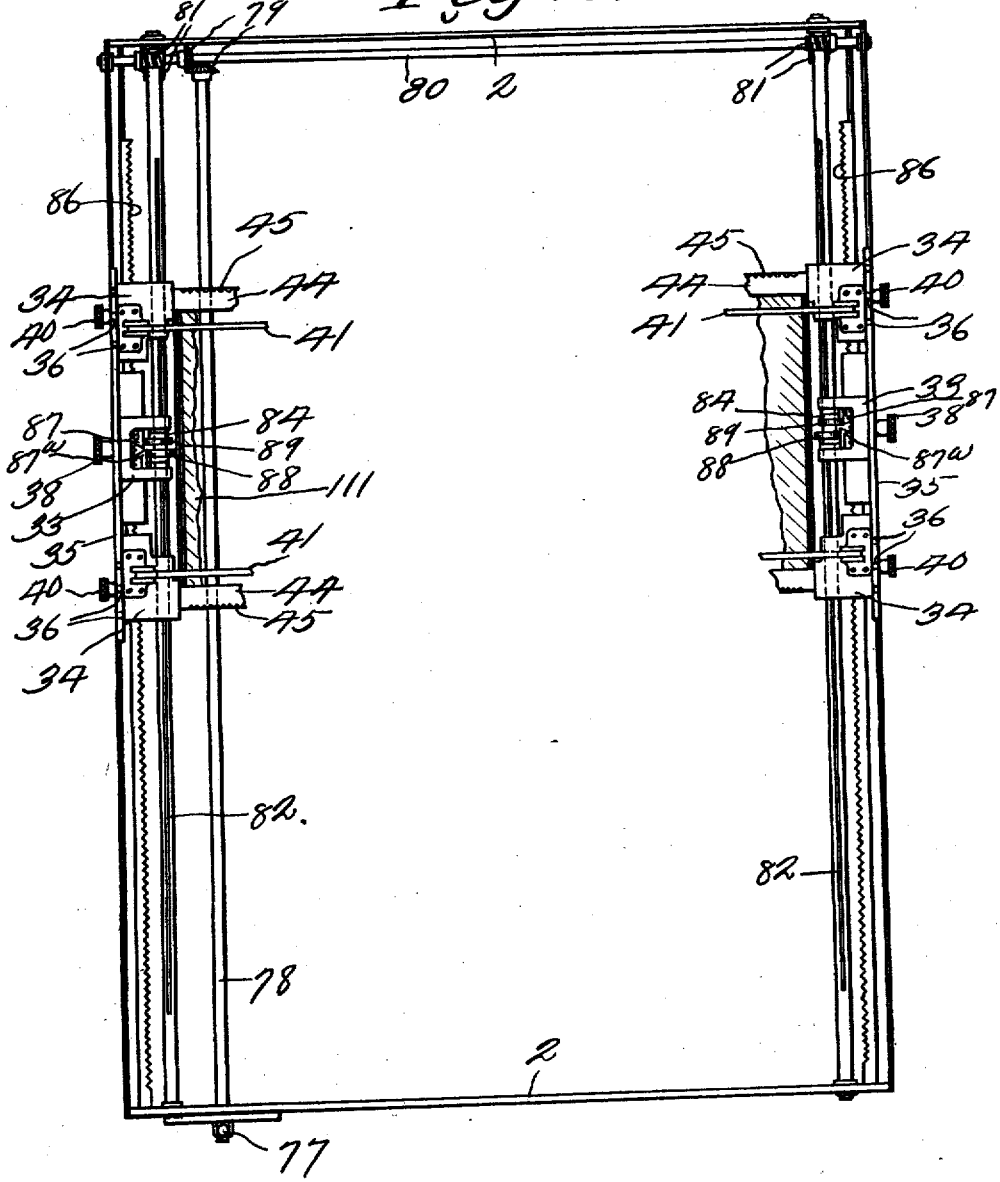

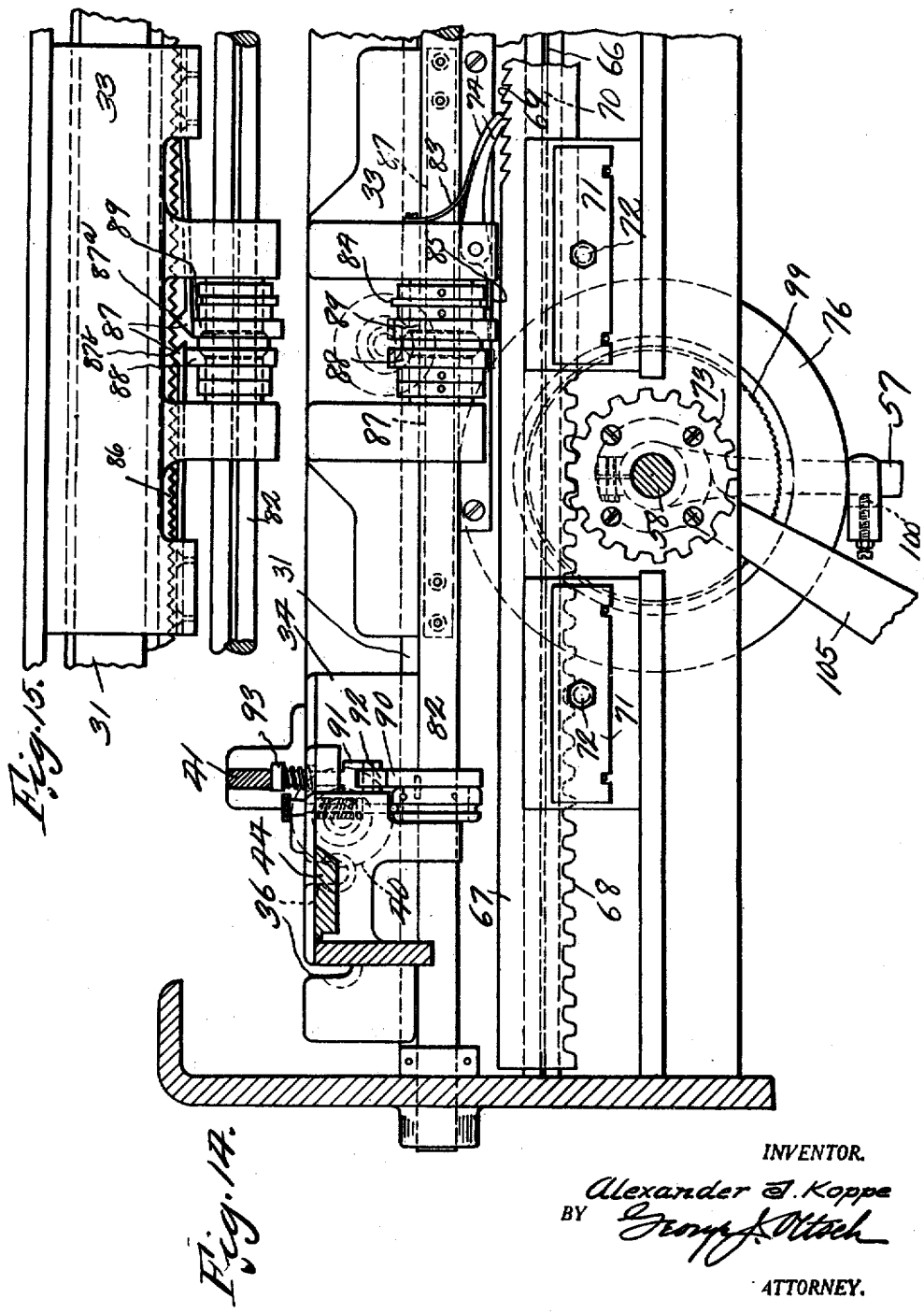

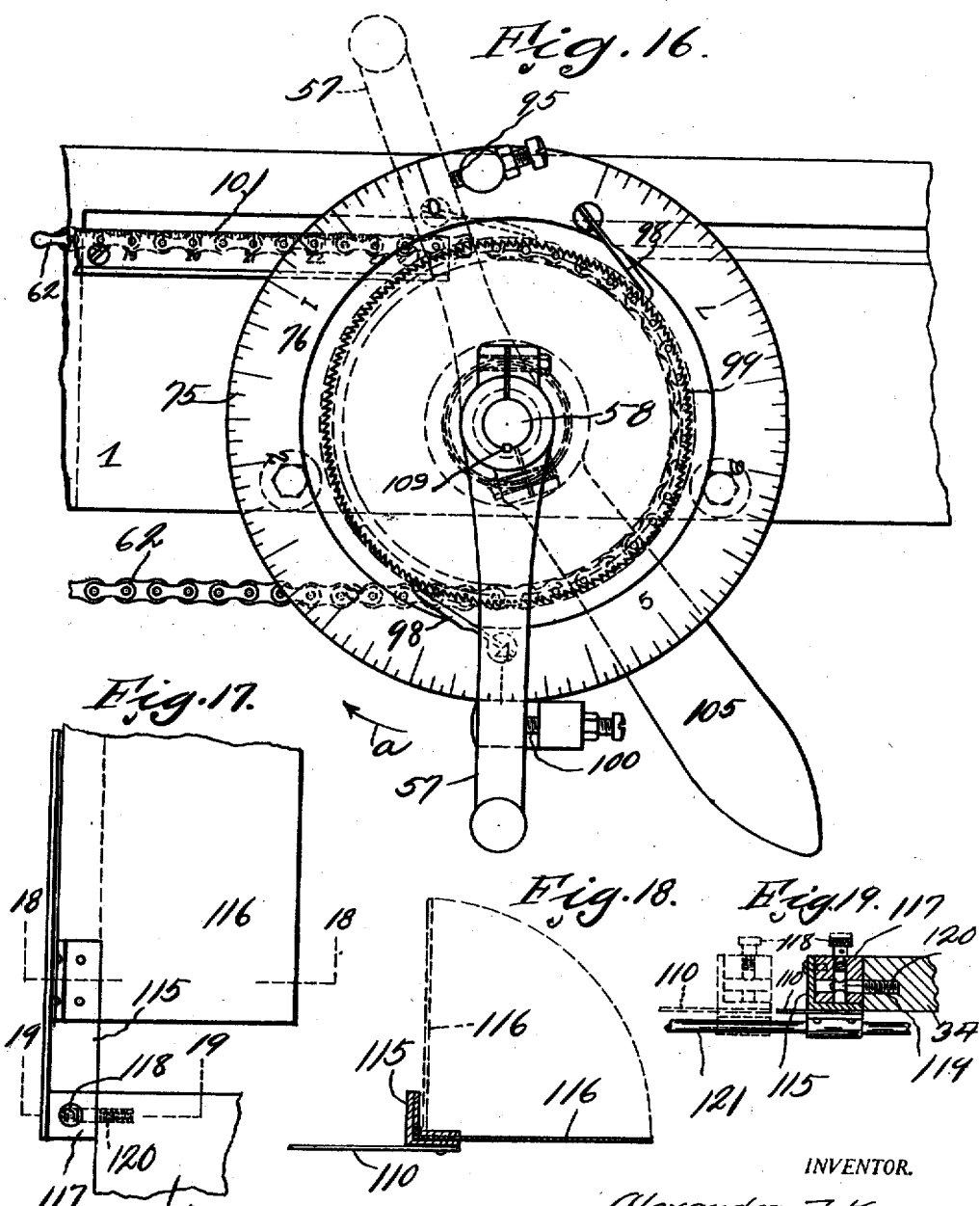

Sept. 30, 1924.

A. T. KOPPE 1,510,007

MACHINE FOR MAKING OFFSET PRESS PLATES

Filed June 30, 1922     11 Sheets-Sheet 11

INVENTOR.
Alexander T. Koppe
BY George J. Hoch
ATTORNEY.

Patented Sept. 30, 1924.

1,510,007

UNITED STATES PATENT OFFICE.

ALEXANDER T. KOPPE, OF CHICAGO, ILLINOIS, ASSIGNOR TO OFFSET DIRECTOPLATE COMPANY, OF CHICAGO, ILLINOIS, A CORPORATION OF ILLINOIS.

MACHINE FOR MAKING OFFSET PRESS PLATES.

Application filed June 30, 1922. Serial No. 572,054.

*To all whom it may concern:*

Be it known that I, ALEXANDER T. KOPPE, a citizen of the United States, residing at Chicago, in the county of Cook and State of Illinois, have invented certain new and useful Improvements in Machines for Making Offset Press Plates, of which the following is a specification.

The invention relates to photographic machines for making offset press plates from negatives carried by a frame, which frame may be quickly and accurately positioned at various points over the press plate in such a manner that the press plate may be substantially entirely covered with images from the negative. The machine is particularly adapted for use in connection with a pressure frame of the type shown in Patent No. 1,396,962, issued November 15, 1921, issued to Alexander T. Koppe.

A further object is to provide a machine for making offset press plates constructed in such a manner that a negative on which a vision is disposed may be accurately positioned at predetermined points above a sensitized piece of zinc used in the usual printing process, and the vision on the negative reproduced on the press plate.

A further object is to mount the negative in a pressure frame disposed above the press plate and carried by a carriage longitudinally movable over the press plate and transversely movable on the carriage, said carriage being controllable in its longitudinal movement in such a manner that it may be accurately positioned and the pressure frame provided with means whereby it may be accurately positioned transversely on the carriage.

A further object is to provide curtains connected to the carriage whereby the portion of the press plate, which is not protected by the carriage, pressure frame or disposed beneath the negative will be protected from the light. The pressure frame having connected thereto curtains which will protect the press plate from the light when the pressure frame is moved transversely of the machine.

A further object is to provide means whereby when the carriage or pressure frame is being moved it will be raised out of engagement with the press plate, thereby preventing scratching or damaging of the press plate.

A further object is to provide the machine with a bed plate on which is stretched a rubber sheet on which the press plate is disposed and stretched, said rubber sheet forming means whereby the sensitized press plate which is formed from zinc will closely engage the negative and conform to the irregularities thereof, such for instance variations in the thickness of the glass forming the negative.

A further object is to provide pivoted bars adjacent the end of the machine and cooperating with the ends of the press plate for forming an air seal and at the same time forming an extension whereby the pressure frame may be positioned so that the negative will extend to the side of the press plate thereby allowing the entire surface of the press plate to be utilized.

A further object is to provide clamping means for holding the ends of the press plate, and means whereby said press plate may be stretched on the rubber sheet. Also to provide lever controlled sprocket and chain means for moving the carriage longitudinally and dial means whereby the distance of movement may be accurately gaged.

A further object is to provide means whereby the spaced blocks forming the carriages at opposite sides of the machine may be spaced apart at various distances, thereby spacing the lifting bars and pressure frame supporting bars in such a manner that various sizes of pressure frames may be supported on the carriage.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the left hand side of the machine.

Figure 2 is a top plan view of the right hand side of the machine.

Figure 3 is a front elevation of the machine.

Figure 4 is an end view of the machine.

Figure 5 is a vertical transverse sectional view through the machine taken on line 5—5 of Figure 1.

Figure 6 is a vertical transverse sectional view through the machine taken on line 6—6 of Figure 2 and showing the carriage and pressure frame in section.

Figure 7 is an enlarged detail sectional view taken on line 7—7 of Figure 3.

Figure 8 is an enlarged detail sectional view taken on line 8—8 of Figure 3 showing a portion of the carriage in section, and showing the pressure frame.

Figure 9 is a vertical transverse sectional view through one side of the machine taken on line 9—9 of Figure 3.

Figure 10 is a vertical detail sectional view through one side of the machine and one of the side blocks of the carriage taken on line 10—10 of Figure 3.

Figure 11 is an enlarged plan view of the left front corner of the machine.

Figure 12 is a sectional view taken on line 12—12 of Figure 11.

Figure 13 is a plan view of the frame of the machine, portions of the carriage and controlling shafting, the bed plate and adjacent mechanism being eliminated to better show the structure.

Figure 14 is a detail sectional view taken on line 14—14 of Figure 2 and showing the carriage at the right hand side of the machine.

Figure 15 is a top plan view of the central carriage block and adjacent parts.

Figure 16 is a front elevation of the dial and controlling lever.

Figure 17 is an enlarged plan view of a portion of one of the side carriage blocks, showing means for attaching a curtain thereto and a hinged shield for extending under the pressure frame.

Figure 18 is a sectional view taken on line 18—18 of Figure 17.

Figure 19 is a sectional view taken on line 19—19 of Figure 17.

Figure 20:
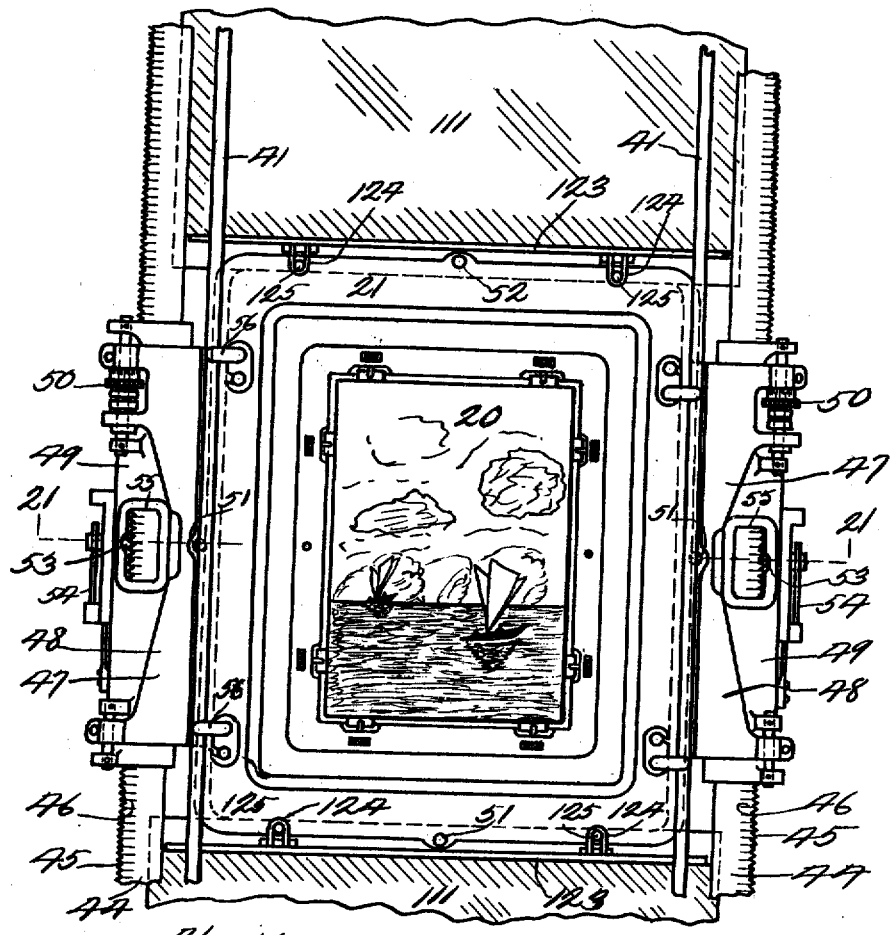
Figure 20 is a top plan view of the pressure frame showing the same mounted on carriage guide bars and portions of screening curtains.
Figure 21:
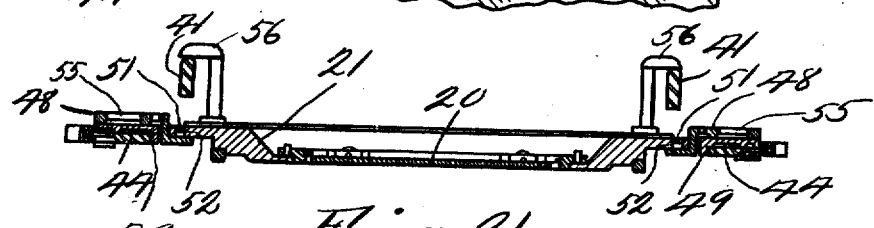
Figure 21 is a transverse sectional view taken on line 21—21 of Figure 20.

Referring to the drawings the numeral 1 designates the frame of the machine and 2 the end members thereof. The end members 2 are connected together by means of the horizontally disposed bed plate 3 on which bed plate a rubber blanket 4 is disposed. The press plate 5 which is shown in Figure 7 rests on the blanket 4, and is only shown in Figure 5, being eliminated in other figures for purposes of clearness.

The rubber blanket is secured at one end 6 to the bed plate 3 and at its other end is wound around a roller 7, which roller is mounted in bearings of the end members 2 of the frame and is provided with a worm gear 8, with which a worm 9 engages, said worm 9 being carried by a shaft 10 extending through the front of the machine and adapted to receive a crank, by means of which crank the roller 7 may be rotated and the blanket 4 drawn taut for closely engaging the bed plate 3. One end of the pressed plate 5 is clamped between a clamping plate 11 and a plate 12 mounted on the bar 13 extending the full length of the machine. A clamping action is given to the plate 11 by turning the screws 14, the screws 15 carried by the plate 12 forming a fulcrum as clearly shown in Figures 7 and 8. The opposite edge of the press plate is received in the clamp 16 and firmly held, said clamp being carried by the adjustable bar 17 which has a sliding connection 18 with one side of the bed plate 3. Threaded through the adjustable bar 17 are adjusting screws 19, the inner ends of which cooperate with the edge of the bed plate 3 in such a manner that the press plate 5 when the adjusting screws are tightened will be drawn perfectly flat and smooth upon the rubber blanket 4, said blanket being slightly yieldable under pressure so that when the negative 20 is forced into contact with the press plate 5 by the vacuum pressure frame 21 through mechanism hereinafter set forth, the glass negative 20 and press plate will accomodate themselves to each other and perfect contact obtained. Glass negative plates are sometimes slightly warped or are thicker at one portion than another, hence the provision of the rubber blanket to overcome these variations and also to prevent breakage of the negative incident to the above irregularities. The vacuum pressure frame 21 is carried by a carriage 22 extending transversely across the machine above the bed plate, said carriage being adapted to be moved longitudinally over the bed plate and the vacuum frame to be manually moved transversely over the bed plate. Any kind of light may be disposed above the machine for supplying the necessary light rays above the negative, no light being shown in the drawings for purposes of clearness.

After the press plate 5 has been positioned as above set forth the sealing plates 23 which extend longitudinally of the machine, to each side of the bed plate and are pivotally connected at 24 to the ends 2 of the frame are closed to the horizontal positions shown in Figures 7 and 8 with their ends 25 in engagement with the press plate thereby forming a substantially air tight seal. The sealing plates 23 when closed are in substantially the same horizontal plane as the press plate and it is obvious that when the pressure frame 21 is adjacent the side of the press plate 5, the frame may engage the sealing plates 23 in such a manner that it is positioned beyond the marginal edge of the press plate and an effective vacuum maintained for obtaining a print of the subject at the very margin of the press plate, thus permitting a greater number of prints to be made on a plate than would otherwise be possible with the use of a vacuum pressure plate. The pintles 26 of the sealing plates 23 extend through one of the ends 2 of the frame and are provided with worm gears 27, with which worms 28 carried by shafts 29 engage, said shafts being adapted to receive on their rectangular shaped ends 30 cranks by means of which cranks the shafts 29 may be rotated and the ends 25 of the sealing plates may be forced into close and binding engagement with the edge of the press plate, thereby forming substantially air tight engagement which will not interfere with the operation of the vacuum pressure frame 21. Disposed at the front and rear sides of the machine are track ways 31, on which track ways the carriage 22 is slidably mounted in such a manner that the carriage may be positioned in various positions longitudinally above the bed plate and press plate carried thereby, thereby allowing the negative carrying frame and vacuum pressure frame 21 to be positioned longitudinally as desired. Disposed in opposite relation on said track ways are substantially identical carriage blocks 32 consisting each of a center block 33 and side blocks 34, which are connected together to move in unison by a plate 35. Each plate 35 is provided with a series of notches 36 equidistant from the center of the middle block 33. The middle block is provided with a threaded pin 37 having threaded thereon a thumb nut 38, which thumb nut serves to clamp the plate 35 to the middle block 33. The side blocks 34 are provided with threaded pins 39 having thumb nuts 40, which threaded pins are adapted to be received by any of the series of notches 36 in the upper edge of the plate. By providing the pin and notch connections, it will be seen that the side blocks 34 may be positioned at different distances apart for readily adjusting the lift bars 41 which connect the oppositely disposed blocks 34 together at different distances apart for cooperating with vacuum pressure frames of different widths, or for positioning said frames, which are usually oblong lengthwise instead of crosswise in relation to the machine. The lift bars 41 are provided with vertically disposed notches 42 which receive pins 43 carried by the side blocks 34, therefore it will be seen that the lift bars 41 may be moved vertically, the mechanism for moving said bars vertically being hereinafter set forth. The side blocks 34 are also connected together by bars 44, which bars are provided on their outer edges with accurately machined teeth 45 corresponding with the graduated markings 46 thereon. The bars 44, Figure 20, slidably support manually shiftable blocks 47, which blocks comprise the frame supporting members 48 and the bar engaging members 49, members 48 and 49 being adjustable in relation to each other by means of the thumb nut 50, thereby allowing said members to be accurately positioned in relation to each other and the frame supporting lugs 51 carried by the members 48 to be centered in relation to the graduated markings 46. The negative carrying frame 21 is provided with apertures 52 for the reception of the pins 51, which pin and aperture connection permit the negative carrying frame to be readily removed and also permit a limited upward movement of the frame without detaching the frame from the pins 51. Each bar engaging member 49 is provided with a spring actuated detent 53, which is forced inwardly by means of the spring 54 and engages the teeth 47 of the guide bar 44, which as well as the graduated markings on the bar are observable through the openings 55 in the slidable member 49 so that the point to which the blocks 47 and the negative carrying frame are to be shifted transversely of the machine may be easily seen and the blocks and frame quickly and accurately positioned. The lifting bars 41 support and carry the negative carrying frame by engaging the L-shaped arms 56 carried by the frame only during the period when a shift of the carriage is made, said lifting bars being raised slightly as will presently appear, to raise the negative 20 out of contact with the press plate so the negative will be clear of and preventing the same from scratching or damaging the sensitized surface of the press plate 5 in the shifting of the vacuum pressure frame and negative to a new position.

By referring to Figures 1 and 2, which figures combined form a top plan view of the machine, the positioning of the vacuum pressure frame on the press plate 5 is as follows. Assuming that twelve prints are to be made on the same press plate 5, and three rows of four prints each. The first row would be made lengthwise of the machine, the spacing between prints having been determined and accomplished by means of mechanism hereinafter set forth. The negative carrying frame is then shifted transversely to the predetermined point for the next row and returned to the starting point at the left end of the machine and likewise for the next row of prints. The carriage shifting crank 57 is carried by the shaft 58 which extends transversely of the machine and has bearings in the side rails 31 thereof, and its cooperating parts are used only for shifting or spacing the negative from left to right, said parts being finally and accurately machined so there will be no lost motion or variations in the successive operations thereof. Mounted on the shaft 58 are sprockets 59, which are loose on the shaft 58 and mounted on the shaft 60 at the left hand side of the machine and rotatable therewith are sprockets 61 and around the sprockets 61 and the sprockets 59 sprocket chains 62 extend, therefore it will be seen that when the shaft 60 is rotated by the crank 63 that the sprockets will simultaneously rotate and that the carriage 22 will be moved to the left by the sprocket chains 62 which are connected at 64 to the middle blocks 33 of the carriage, it being seen that the sprocket chains 62 are used only for returning the carriage to the starting point. The trackways 31 at the opposite sides of the machine are provided on their inner sides with shoulders 65 extending the full length thereof, also the V-shaped grooves 66 as shown in Figure 10, and also in Figure 14. Slidably mounted on the shoulder 65 is a rack bar 67, which rack bar is provided with gear teeth 68 on its lower edge and ratchet teeth 69 on its upper edge and also has a longitudinally V-shaped rib 70 which slidably engages in the groove 66. Yieldable spring plates 71, which are secured to the trackways by means of bolts 72 serve to hold said rack bar 67 in position and at the same time permit the rack bar to be shifted from end to end of the machine by means of the carriage shift lever 57 and the pinion 73 on the shaft 58 which is rotated by said crank. In Figure 14 the rack bar is shown shifted to the end of its limit at the right end of the machine, said view showing the parts viewed outwardly. As shown in this view, each of the middle blocks 33 on the trackways 31 carries pivotally mounted spring pressed pawls 74, two on each block. The ends of the pawls 74 engage the ratchet teeth 69 of the rack bar 67, which teeth 69 are spaced one sixteenth inch to correspond with the one sixteenth inch graduations 75 on the face of the dial 76, which dial graduations however, by referring to Figure 16 appear a greater distance apart than the teeth 69 and necessarily so because of their distance from the shaft 58. When the lever 77, Figure 4 is in the full line position shown in said figure, it is in neutral position, which lever through shaft 78, bevelled gear 79, shaft 80 and worm gears 81 serve to rock the shafts 82 which extend longitudinally of the machine to the front and rear sides thereof, both of the carriage feed detents 74 are held out of engagement with the ratchet teeth 69 of the rack bar 67 against the action of the springs 83 and permitting the carriage 22 as a whole to be shifted back to the starting position to the left of the machine by means of the sprocket chains 62, said detents being held out of positions by the cam 84, on the shafts 82 by depressing the inner ends 85 of the detents 74. Mounted on the inner sides of the track ways 31 are inwardly faced toothed bars 86 with which toothed bars spring actuated detents 87 carried by the center blocks 33 of the carriage are adapted to engage, by their free ends, being engaged and moved by the cams 88 and 89, which are also carried by the shafts 82, said detents being so arranged that one thereof will engage the toothed bar according to the position of the lever 77 controlling said shafts 82, the arrangement of the ends of said pawls also being such that they will engage the teeth of the toothed bars 86 at either a sixteenth or one eighth movement of the carriage, the same as the pawls 74, which engage the feed rack bar 67. Therefore it will be seen that the carriage is completely locked or unlocked at any predetermined position by the controlling lever 77. Splined on the shafts 82 at both sides of the carriage and moving with each of the blocks 34 are cams 90 located directly below the ends of the lift bars 41 for raising the same and the vacuum pressure frame and negative through the medium of the vertically slidable member 91, which mounts the roller 92 which is engaged by the cam 90. The member 91 has a bearing in the block 34 and its upper end 93 is disposed below the lift bar 41. Each block 34 is provided with a member 91, therefore it will be seen that the lift bars 41 will be simultaneously raised and in horizontal position, thereby causing the vacuum pressure frame to be moved upwardly in a horizontal position from engagement with the press plate 5. When the lever 77 is in neutral position shown in Figure 4, said lift bars 41 will be raised and carriage locking detents 87 as well as carriage feed pawls 74 will be out of engagement so that the carriage 22 can be returned to the starting point by means of the sprocket chains 62. When lever 77 is moved to either intermediate position 94 as shown in dotted lines, Figure 4, the carriage feed pawls 74 engage the teeth of the rack bar 67, but the carriage locking detents 87 will still be held out of engagement and lift bars 41 still held raised so that the carriage 22 can be given a feed movement by the carriage feed crank 57 a predetermined distance according to the set of the dial 76 and its stop 95. When the feed shift has been made the stop 95 on the dial having been set to stop the feed crank movement at either a one sixteenth or one eighth graduation thereof, a full throw of the lever 77 to the dotted line position 96 to the left will cause the detent nose 87ª to engage and positively lock the carriage against movement and simultaneously permit the lift bars to move downwardly and the negative to come in contact with the press plate 5 for making a print. The extreme opposite movement of the lever 77 to the position 97 shown in dotted lines in Figure 4 will cause the detent nose 87ª to engage to positively lock the carriage at a one sixteenth setting of the dial and the lift bars 41 to lower for making a print. The locking detents are accurately machined and cooperating with such precision that the slightest lost motion in the carriage feeding means will be corrected by the wedged shaped ends of the detents as they are forced into engagement with the teeth of the bar causing the carriage to be moved to the precise position. Exact equal spacing movement of the carriage is thus obtained, and a positive locking of the carriage is obtained at the same time. When the lever 57 is moved in the direction of the arrow $a$ Figure 16, the spring pawls 98 engage the ratchet wheel 99 and cause said wheel to rotate until the lever 57 engages the stops 95 at which time the lever returns to the stop 100, the return movement of the lever not causing a rotation of the ratchet wheel 99 and consequently the carriage may be intermittently moved to the right to various predetermined positions on the press plate, which predetermined positions may be established through the medium of the scale 101 and the pointer 102 carried by the carriage. The dial 76 is mounted on a sleeve 103 splined on the shaft 58, which sleeve has a flanged outer end 104 adapted to bear against the outer face of the dial 76. Threaded on the sleeve 103 is a dial locking lever 105, which locking lever upon a slight rotation thereof will draw the sleeve inwardly and cause the male clutch member 106 to bind in the female clutch 107 in the fixed bracket 108 which carries the stop 100 and thus locking the dial in any adjusted position. The dial may thus be adjusted and quickly and easily to limit the throw of the carriage feed lever 57. The ratchet wheel 99 is keyed at 109 to the shaft 58, therefore it will be seen that when the feed lever 57 is moved in the direction of the arrow $a$ the shaft 58 will be rotated and the carriage accurately positioned through the gears 73 and the rack bars 67.

As hereinbefore set forth the return of the carriage to the left is accomplished through the rotation of the shaft 60 which carries the crank 63 and the sprocket chains 62. The transverse movement of the frame 21 being manually accomplished. It will be seen that as the carriage and frame is moved it will be necessary to provide means for protecting the portion of the press plate which is not disposed below the vacuum pressure frame from the light which may be disposed above the machine. To protect the portion of the press plate 5 which is not disposed beneath the pressure frame from the light rays curtains are used. The curtains for protecting the sensitized press plate, which is not covered by the negative or negative carrying frame comprise two end curtains 110 and two side curtains 111. These curtains wind on self winding spring rollers 112, which are carried by the end members of the frame 2 and by rollers 113 carried by the central blocks 33 of the carriage as shown in Figure 1. The curtains 110 pass downwardly and inwardly over guide rollers 114 and are attached to the undersides of L-shaped metal members 115 shown in Figures 17 to 19 inclusive. The L-shaped members are provided with hinged plates 116 and end blocks 117, which end blocks are provided with spring pressed pins 118 adapted to engage the annular grooves 119 of pins 120 extending from the sides of the side blocks 34 of the carriage. These curtains are as wide as the bed plate 5 and the hinged plates 116 thereof are adapted to extend beneath the tooth cross bars 44 of the carriage and in close relation to the underside thereof thereby excluding light rays from the sensitized press plates as shown in Figure 7. The curtains automatically wind on conventional forms of rollers, such for instance as window shade rollers and wind up and follow the carriage as it is shifted longitudinally of the machine. The curtains are detachable from the carriage blocks by simply raising the spring pressed pins 118, the members or blocks 117 sliding on rods 121 extending from end to end of the machine to hold the freed ends of the curtains off of the press plate 5 when applying or detaching the same from the carriage, it being necessary to detach the curtains, as it is necessary to remove the cross members of the carriage when applying or removing the press plate from the machine. The hinged plates 116 may be swung to an upright position as shown by dotted lines in Figure 18 when the curtains are detached and curtains wound on their rollers in order that the sealing plates 23 may be raised and lowered without interference from adjacent mechanism.

The side curtains 111 extend upwardly and inwardly over the guide rollers 122 and are provided at their ends with L-shaped plates 123 which carry looped members 124 which engage over pins 125 on the negative carrying frame, and which also wind and unwind as said frame is shifted transversely of the machine. All four curtains have a marginal overlapping relation so as to exclude light from the sensitized press plate 5 not covered by the negative in the shifting operation of the latter. The ends of these curtains are also easily detachable from the vacuum pressure frame.

From the above it will be seen that an offset press plate machine is provided, which is simple in construction, positive in its operation, and one wherein a vacuum pressure frame may be accurately positioned at predetermined positions above a press plate, then moved into engagement with the press plate, locked to position until after the printing operation, then raised out of engagement and moved to a new position. It will also be seen that by providing the sealing bars the entire surface of the press plate 5 may be utilized.

The invention having been set forth what is claimed as new and useful is:—

1. The combination with the bed plate of a machine for photographically preparing offset press plates, of a resilient blanket carried by said bed plate, and means operable for stretching the blanket whereby the degree of stretch thereof may be varied.

2. The combination with the bed plate of a machine for photographically preparing press plates, of a resilient blanket extending over said bed plate, and means operable for stretching and holding said blanket whereby it will closely engage the bed plate.

3. The combination with the bed plate of a machine for photographically preparing press plates, of a resilient blanket covering said bed plate, one end of said blanket being attached to one end of the bed plate, a roller, the other end of said blanket being attached to said roller, and means whereby said roller may be rotated for drawing and holding the blanket taut.

4. The combination with the bed plate of a machine for photographically preparing press plates, said bed plate being adapted to receive a sensitized press plate, a movable negative carrying frame disposed above the bed plate and press plates, of adjustable means cooperating with the ends of the press plate whereby said negative carrying frame may be positioned beyond the end of the press plate.

5. The combination with the bed plate of a machine for photographically preparing press plates, said bed plate being adapted to receive a press plate, a negative carrying frame disposed above the bed plate, of sealing bars disposed adjacent the ends of the bed plate and adapted to engage the ends of the press plate and form an extended base for the negative carrying frame.

6. The combination with the bed plate of a machine for photographically preparing press plates, said bed plate being adapted to receive a press plate, a movable negative carrying frame disposed above the bed plate, of pivoted sealing bars adjacent the ends of the bed plate and forming means whereby the side of the negative carrying frame may be disposed beyond the ends of the press plate carried by the bed plate.

7. The combination with the bed plate of a machine for photographically preparing press plates, said bed plate being adapted to receive a press plate, a negative carrying frame disposed above the bed plate, of a sealing bar disposed adjacent the end of the bed plate and engaging the end of the press plate and forming a base for a portion of the negative carrying frame.

8. The combination with the bed plate of a machine for photographically preparing press plates, said bed plate being adapted to receive a press plate, a movable negative carrying frame disposed above the bed plate, of a pivoted sealing bar adjacent the ends of the bed plate and adapted to have its free end engage the end of the press plate thereby allowing a portion of the negative carrying frame to be disposed beyond the edge of the press plate.

9. The combination with the bed plate of a machine for photographically preparing press plates, said bed plate being adapted to receive a press plate, a movable negative carrying frame disposed above the bed plate, of pivoted sealing bars disposed adjacent the ends of the bed plate, the free ends of said bars cooperating with the press plate to form a substantially air tight seal and support the negative carrying frame beyond the ends of the press plate, and means whereby said sealing bars may be simultaneously controlled.

10. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond the ends of the press plate, and means whereby said sealing bars may be controlled in their pivotal movement.

11. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond the ends of the press plate, and shaft and gear means whereby said sealing bars may be controlled in their pivotal movement.

12. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond port the ends of the press plate, and shaft and gear means whereby said sealing bars may be simultaneously moved into and out of engagement with the press plate.

13. A machine for photographically preparing offset press plates including a base to support a sensitized press plate, a carriage disposed above the base, said carriage being movable towards opposite sides of the machine, a negative carrying frame carried by said carriage, said negative carrying frame being transversely movable at an angle to the first mentioned movement of the carriage, and curtain means attached to and controlled by the movement of the carriage and negative carrying frames whereby portions of the press plate outside of the frame will be protected from light rays.

14. The combination with a machine for photographically preparing offset press plates, said machine comprising a bed plate for the reception of a press plate, a carriage movable above the bed plate, a negative carrying frame movable on the carriage at an angle to the direction of movement of the carriage, of curtains attached to and controlled by said carriage and frame whereby the sensitized plate which is not exposed to the negative will be covered.

15. The combination with a machine for photographically preparing offset press plates, said machine comprising a bed plate for the reception of a press plate, a carriage movable adjacent said press plate, of curtains for protecting the unexposed portion of the press plate, a negative carrying frame carried by said carriage, said curtains having their free ends connected to the carriage and controlled by the movement thereof.

16. The combination with a machine for photographically preparing offset press plates, said machine comprising a bed plate for the reception of a press plate, a carriage movable above the bed plate, a negative carrying frame movable on the carriage, of curtains carried adjacent the sides of the machine, the free ends of opposite curtains being connected to the carriage, the free ends of the other opposite curtains being connected to the negative carrying frame, whereby the movement of said carriage and frame controls the movement of the curtains.

17. The combination with a machine for photographically preparing offset press plates, said machine comprising a bed plate for the reception of a press plate, a carriage movable above the bed plate, curtains carried at the opposite sides of the machine, the free ends of said curtains being detachably connected to the carriage and the movement of the carriage controlling the movement of the curtains.

18. The combination with a machine for photographically preparing offset press plates, said machine comprising a bed plate for the reception of the press plate, a carriage movable above the bed plate, curtains carried at opposite sides of the machine, said curtains having their free ends detachably connected to the carriage, and hinged extension members carried by the free ends of the curtains and underlying the opposite sides of the carriage.

19. The combination with a machine for photographically preparing offset press plates, said machine comprising a bed plate for the reception of a press plate, a carriage movable above said bed plate, a negative carrying frame movable on the carriage at an angle to the direction of movement of the carriage, of roller carried curtains at the opposite sides of the machine, the free ends of opposite curtains being detachably connected to the carriage and the free ends of the other oppositely disposed curtains being detachably connected to the negative carrying frame and means cooperating with the rollers for winding up the curtains whereby the curtains play out and wind up under movement of said carriage and frame.

20. The combination with a machine for photographically preparing offset press plates, said machine comprising a bed plate for the reception of a press plate, of a carriage carried by said machine for supporting a negative carrying frame, of means for adjusting the distance between the carriage members bearing the negative carrying frame, whereby different sizes of negative carrying frames may be supported by said carriage.

21. The combination with a machine for photographically preparing offset press plates, said machine comprising a bed plate for the reception of a press plate, of a carriage movable on said machine above the bed plate, said carriage comprising spaced supporting blocks mounted on trackways, supporting opposite blocks, means for bars connecting a negative carrying frame on supporting said bars and means whereby said blocks may be adjusted in relation to each other whereby different sizes of negative carrying frames may be received.

22. The combination with a machine for photographically preparing offset press plates, said machine comprising a bed plate for the reception of a press plate, of a carriage carried by said machine above the bed plate, a negative carrying frame supported on said carriage and movable thereon, said carriage comprising spaced blocks mounted on trackways at opposite sides of the machine, frame supporting bars connecting said blocks, and means whereby said blocks at each side of the machine may be adjusted towards and away from each other.

23. The combination with a machine for photographically preparing offset press plates, of a negative carrying frame carriage for said machine, said carriage being provided with means for varying the dimension thereof whereby negative carrying frames of different size may be received.

24. The combination with a machine for photographically preparing offset press plates, of a negative carrying frame carriage for said machine, said carriage being mounted on trackways at opposite sides of the machine, the ends of the carriage being formed from spaced blocks, connecting bars between the blocks at each end of the carriage, means whereby said blocks may be adjusted towards and away from each other, negative frame supporting bars connecting the end blocks together and extending across the machine, and means whereby the negative carrying frame may be positioned on the carriage at a predetermined point.

25. The combination with the bed plate of a machine for photographically preparing press plates, said bed plate having a resilient blanket thereon, of means for holding a press plate in close engagement with the blanket, said means comprising a clamping member carried adjacent one end of the bed plate and adapted to receive one end of the press plate, a bar having a slidable connection with the other end of the bed plate, means for forcing said bar away from the end of the bed plate, and clamping means carried by said bar for receiving and holding the end of the press plate.

26. The combination with a longitudinally movable carriage of a machine for photographically preparing offset press plates, said carriage having mounted thereon a negative carrying frame, of means for moving said carriage to successive predetermined positions longitudinally of the machine, said means being lever controlled, cooperating cam and pawl means for locking said carriage at the predetermined positions, and means for returning the carriage to initial position independent of the cam and pawl locking means.

27. The combination with a longitudinally movable carriage of a photographically preparing offset press plate machine, said carriage having mounted thereon a negative carrying frame, of means for moving said carriage to predetermined positions longitudinally of the machine, said last named means being lever controlled, locking pawls for locking the carriage at the predetermined positions, lever means for controlling said pawls, cams controlled by said lever means and cooperating with the pawls, said lever means forming means for releasing the pawls, and means for returning the carriage to initial position.

28. The combination with a longitudinally movable carriage of a photographically preparing press plate machine, said carriage having mounted thereon a movable negative carrying frame, said negative carrying frame having a connection with the carriage whereby it may move vertically, lifting bars carried by the carriage and cooperating with the frame for moving the same vertically, and lever controlled means whereby said lifting bars will raise the frame when the carriage and frame are moved from one position to another.

29. The combination with a negative carrying frame, said negative carrying frame being movably mounted on a movable carriage of a machine for photographically preparing offset press plates, of means for moving said negative carrying frame vertically on the carriage when the frame and carriage are moved from one position to another, said means comprising lifting bars cooperating with the frame, and lever controlled camming means whereby said lifting bars may be raised.

30. The combination with a movable carriage of a machine for photographically preparing offset press plates, said machine having vertically movable thereon by means of lift bars a negative carrying frame, of means for moving said carriage to a predetermined point, said means comprising rack bars disposed adjacent the ends of the carriage slidably mounted, lever controlled gears meshing with said rack bars, spring actuated pawls carried by the carriage, said spring actuated pawls cooperating with ratchet teeth on the rack bars, spring actuated pawls cooperating with rack teeth on the machine, and lever controlled cam means whereby said carriage after being moved to a predetermined position may be locked and the lift bars lowered.

31. A carriage operating mechanism for machines for photographically preparing offset press plates, said controlling mechanism comprising rack bars longitudinally movable, lever controlled gear means for moving said rack bars a predetermined distance, spring actuated pawls carried by the carriage and cooperating with ratchet teeth carried by the rack bars, spring actuated pawls carried by the carriage and cooperating with teeth carried by rack bars on the machine, negative frame lifting bars carried by the carriage, and lever controlled cam means whereby after the carriage has been moved to a predetermined position said carriage will be locked, the lift bars lowered for a printing operation, the lift bars raised after a printing operation, and the spring actuated pawls for locking and feeding the carriage rendered inoperative, thereby allowing the carriage to be returned to initial position.

32. The combination with a movable carriage of a machine for photographically preparing offset press plates, said carriage being provided with lift bars for moving a negative frame into engagement with the press plate, of means for controlling said carriage and lift bars, said means comprising longitudinally movable rack bars, lever controlled means for moving said rack bars predetermined distances, spring actuated pawl connections between the carriage and rack teeth carried by the rack bar, toothed bars carried by the machine adjacent the ends of the carriage, locking detents carried by the carriage and cooperating with the teeth of the toothed bars, and lever controlled cam means whereby after the carriage has been moved to a predetermined point, the carriage feeding pawls after the printing operation will be disengaged, the locking pawls disengaged, and the carriage allowed to be returned to initial position.

33. The combination with a movable carriage of a machine for photographically preparing offset press plates, said carriage being provided with lift bars for controlling the movement of the negative carrying frame, movable rack bar means for moving the carriage to predetermined positions, pawl and ratchet teeth connection between the rack bar and the carriage, cam controlled detents carried by the carriage and cooperating with teeth carried by the machine for locking the carriage at predetermined positions, cam means for lowering the lift bars after the locking operation, cam means for raising the lift bars after a locking operation and rendering the pawl and rack connections inoperative, unlocking the carriage, and allowing the same to be returned to initial position.

34. The combination with a movable negative carrying frame carriage of a machine for photographically preparing offset press plates, of means for moving said carriage to predetermined points, said means comprising a longitudinally movable rack bar, spring means for holding said bar frictionally, spring actuated pawls carried by the carriage, said spring actuated pawls cooperating with the ratchet teeth carried by the rack bar, a dial having graduations thereon corresponding to the graduations of the teeth of the rack bar with which the pawls cooperate, and lever controlled cam means for disengaging said pawls.

35. The combination with a movable negative carrying frame carriage of a machine for photographically preparing offset press plates, of means for moving said carriage to predetermined positions, said means comprising a longitudinal movable rack bar, spring means for holding said rack bar against displacement, spring actuated pawls carried by the carriage, said spring actuated pawls cooperating with ratchet teeth carried by the rack bar, said ratchet teeth and pawls being positioned in such a manner that when one of the pawls is between the teeth the other pawl will engage the adjacent tooth, a dial, a shaft extending through said dial, said shaft being provided with a gear, an operating handle rotating said shaft a predetermined distance between stops adjacent graduations on the dial, said dial graduations corresponding with the spacing of the ratchet teeth.

36. The combination with a longitudinally movable carriage of a photographically preparing press plate machine, of a member slidably carried by the machine, means permitting selective points of connection between said slidable member and the carriage for moving the latter in the movement of the former, and means for shifting the slidable member.

37. The combination with a longitudinally movable carriage of a photographically preparing press plate machine, of a shiftable member carried by the machine, means permitting selective points of connection between said shiftable member and the carriage, means for locking the carriage against movement, and control means operative in its movement for actuating said locking means and breaking the connection between the shiftable member and the carriage.

38. The combination with a longitudinally movable carriage of a photographically preparing press plate machine, of lifting means carried by said carriage, a negative frame having connection with said lifting means, means for locking the carriage against movement, and means operable for lowering said lifting means for a printing operation and actuating said locking means for locking the carriage against movement.

39. The combination with a longitudinally movable carriage of a photographically preparing press plate machine, of lifting means carried by said carriage, a negative frame adapted to be raised and lowered through the action of said lifting means and alternately supported by said lifting means and carriage, means for locking the carriage in the printing position, and a control member operable in its movement to actuate said carriage locking means and lifting means in unison.

40. The combination with a longitudinally movable carriage of a photographically preparing press plate machine, of lifting means carried by said carriage, a negative frame mounted on said carriage, means effecting a connection between the negative frame and said lifting means upon an upward movement of the lifting means and a disconnection therebetween upon a lowering of the lifting means, and means for controlling the lifting means.

In testimony whereof I affix my signature.

ALEXANDER T. KOPPE.